United States Patent [19]

Zwicky

[11] Patent Number: 4,826,404
[45] Date of Patent: May 2, 1989

[54] MARINE PROPELLER AND HUB ASSEMBLY

[76] Inventor: Alan E. Zwicky, Rte. 2, Box 116, Valley Mills, Tex. 76689

[21] Appl. No.: 194,562

[22] Filed: May 16, 1988

Related U.S. Application Data

[63] Continuation-in-part of Ser. No. 129,226, Dec. 7, 1987, abandoned.

[51] Int. Cl.[4] .................. B63H 1/20; B63H 21/26; B63H 23/00
[52] U.S. Cl. .................. 416/134 R; 416/93 A; 416/169 R; 416/244 B
[58] Field of Search ............ 416/93 A, 134 R, 169 C, 416/241 A, 244 B, 245 A

[56] References Cited

U.S. PATENT DOCUMENTS

| | | | |
|---|---|---|---|
| 2,539,630 | 1/1951 | Krueger et al. | 416/134 R X |
| 2,548,839 | 4/1951 | Coombes | 464/89 X |
| 2,564,826 | 8/1951 | Yoder | 464/89 X |
| 2,993,544 | 7/1961 | Carlson | 416/134 R X |
| 3,477,794 | 11/1969 | Abbott et al. | 416/134 R |
| 3,748,061 | 7/1973 | Henrich | 416/93 A |
| 4,452,591 | 6/1984 | Fishbaugh et al. | 416/134 R X |

FOREIGN PATENT DOCUMENTS 704497 2/1954 United Kingdom ............ 416/134 R Primary Examiner—Everette A. Powell, Jr.
Attorney, Agent, or Firm—Kanz, Scherback & Timmons

[57] ABSTRACT

A hub assembly comprising a driver telescoped within a driven member is disclosed. A plurality of elastomeric members are disposed between the driving and driven members within mating parallel semi-circular grooves in the opposed surfaces of the driving and driven members of the hub.

9 Claims, 1 Drawing Sheet

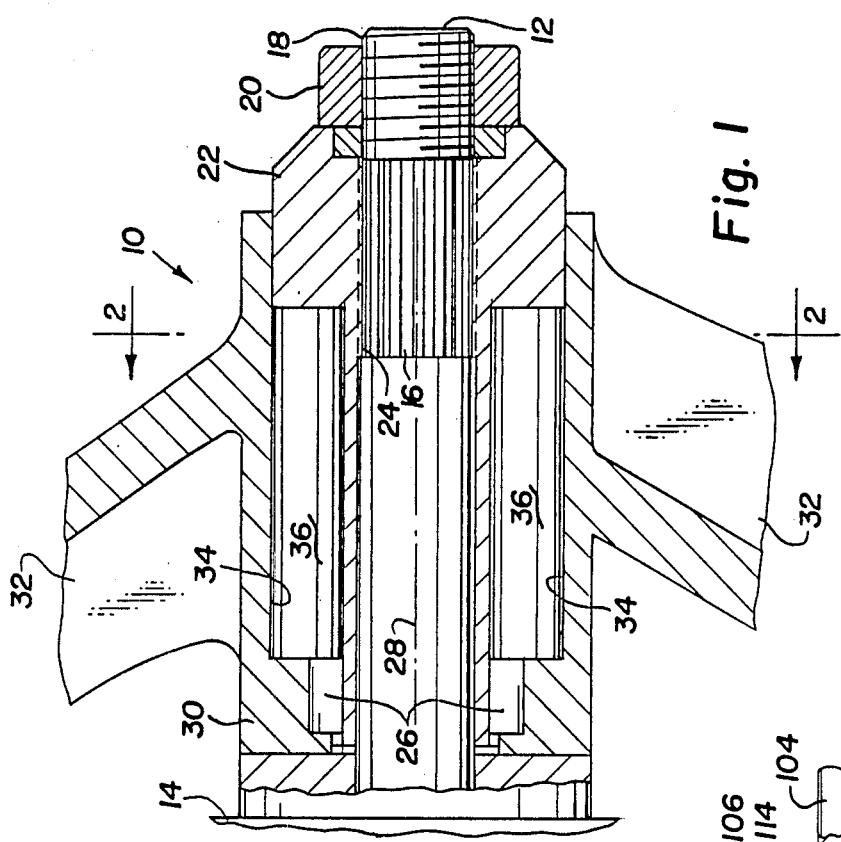
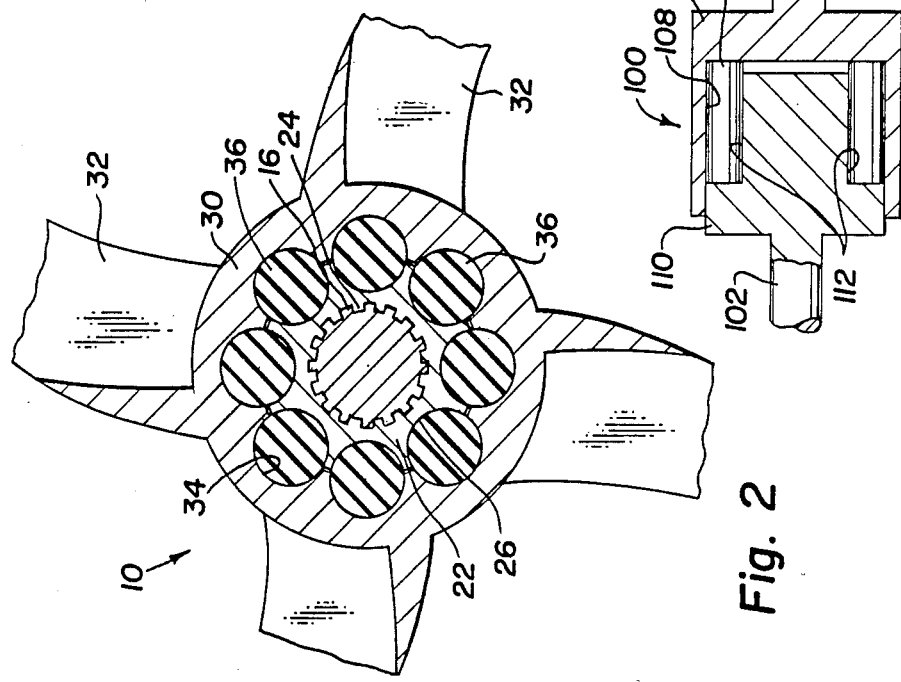
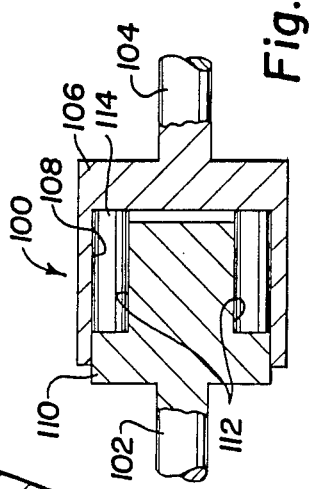
Fig. 1
Fig. 2
Fig. 3

MARINE PROPELLER AND HUB ASSEMBLY

This application is a continuation-in-part of application Ser. No. 07/129,226 filed Dec. 7, 1987 entitled Improved Coupling Apparatus, now abandoned.

This invention relates generally to improved coupling apparatus. More particularly, but not by way of limitation, it relates to a marine propeller and hub assembly having shock absorbing means disposed between the driving and driven members of the hub for the purpose of transmitting torque and for absorbing shock generated or transmitted by one of the members.

For many years it has been standard practice to attach a marine propeller to the shaft driving the propeller by means of a shear pin. In the event the propeller should strike a log, the bottom or other obstruction during operation of the boat, the pin would shear permitting the propeller shaft to rotate relative to the propeller. Thus, damage to the propeller, shaft and engine would be avoided. It should be evident, however, that once the shear pin has parted, no further torque can be transmitted to the propeller and thus the boat can not be propelled by the engine until the shear pin is replaced.

More recently it has become a fairly standard practice to connect a propeller to a driver member which is mounted on the shaft with an intervening elastomeric member. The purpose of the elastomeric member, which is bonded to the driver member and to the propeller hub, is to transmit torque from the shaft to the propeller as well as absorb shock encountered in the operation of the boat. Such arrangements have proven to be generally satisfactory. However, over a period of time the bond between the hub and the elastomer or between the elastomer and the shaft fails or is caused to fail, through impact or otherwise, and no torque can be transmitted from the engine to the propeller and the boat cannot be operated.

In an effort to alleviate the bonding failure problem, U.S. Letters Pat. No. 2,539,630 to Krueger disclosed using splines on the exterior of the shock absorbing member and generally semi-circular recesses within the driven member or the hub. A unitary molded elastomeric member having internal and external surfaces mating with the splines and grooves is slipped into the hub and over the driver member to provide transmission of torque from the shaft, through the driver member, through the elastomeric material and to the propeller. This solution has been relatively successful in some cases, but the design has not been successful when used in high torque situations since the splines tend to shear the elastomeric material and cause failure of the coupling. A further difficulty with the Krueger, et al. design has been that the unitary molded elastomeric member is extremely expensive and difficult to obtain except from the manufacturer who manufactured the propeller.

Alternative shock absorbing systems have been devised (see British patent No. 704,497) which employ individual elastomeric rods which are circular in cross-section disposed in oppositely disposed recesses in a driver telescoped within a driven member. In such cases, however, the recesses are not semi-circular but are wide shallow grooves. As a result, the circular rods do not fill the elliptical cylinders defined. Accordingly, the driver rotates with respect to the driver member until the cusps on the driver move the rods into contact with cusps on the driven member. This system works quite well at relatively low rotational speeds and when the driven member exhibits very little inertial resistance. However, if high torque is applied rapidly to the driver when the driven member is heavily loaded or otherwise exhibits high inertial resistance to rotation, the driver is permitted to take a "running start" with respect to the driven hub and may impact the shock absorbing material traveling at a high angular velocity. This not only causes impact damage to the shock absorbing material but causes an undesirable secondary shock throughout the coupling system. Furthermore, since the round (in cross-section) rods are rolled between converging in elliptical sidewalls, there is a tendency to flatten the rods and present a substantially reduced cross-section at the point of maximum stress, thus reducing its shock absorbing characteristics and subjecting it to high shear potential.

In accordance with the present invention an improved coupling system is provided which comprises a hub with a driven member having a plurality of circumferentially spaced grooves extending generally parallel with the rotational axis thereof. The grooves have a full semi-circular cross-section taken perpendicular to the axis. The driver member has a plurality of circumferentially spaced grooves extending generally parallel with the axis and aligned with the grooves in the driven member when the driver member and driven member are arranged in telescoping relationship to form a plurality of cylinders. An elastomeric deformable member circular in cross-section is disposed in each cylinder for transmitting torque from one member to the other and for absorbing shock forces generated or transmitted by one of the members.

The invention disclosed herein obviates the limitations and disadvantages of the prior art and, suprisingly, provides unique advantages which were unexpected and not obtainable using prior art couplings. In accordance with the invention, both the driver portion and the driven portion have full semi-circular grooves formed therein and the outer periphery of the driver portion closely fits within the inner periphery of the driven portion. Thus, the semi-circular grooves, when aligned, form cylinders which are substantially circular in cross-section. Shock absorbing material is inserted into the cylinders to completely fill the cylinder in cross-section so that any rotation of either member with respect to the other member of the hub meets the full resistance of the shock absorbing material. However, since the cylinders are separate from each other, the shock absorbing material may be placed in only selective areas of the cylinders as desired to produce a coupling with selectively variable torque shear loads. Furthermore, the rate of compression can be varied as desired by using spheres or ellipsoids instead of rods as the shock absorbing material. Other features and advantages of the invention will become more readily understood from the following detailed description taken in connection with the appended claims and attached drawing in which:

FIG. 1 is a vertical cross-sectional view taken through a marine propeller incorporating a coupling hub constructed in accordance with the invention;

FIG. 2 is a transverse cross-sectional view of the propeller of FIG. 1 taken generally along line 2—2 of FIG. 1; and FIG. 3 is a cross-sectional view of another coupling hub constructed in accordance with the invention and connecting a pair of shafts.

Referring to the drawing and to FIG. 1 in particular, shown therein and generally designated by the reference character 10 is a marine propeller mounted on a drive shaft 12 extending from the stern 14 of a boat or the like (not shown). The shaft 12 includes a plurality of splines 16 along a portion thereof and has threads 18 mating with a nut 20 utilized to retain the propeller 10 on the shaft 12. The propeller hub assembly includes a driver member 22 fitted over the shaft 12.

The driver member 22 includes a splined portion 24 mating with the splines 16 on the shaft 12 for transmission of torque from the shaft 12 to the driver member 22 as more clearly illustrated in FIG. 2. The exterior of the driver member 22 is provided with a plurality of circumferentially spaced full semi-circular grooves 26 extending generally parallel with the rotational axis 28 of the shaft 12.

The propeller hub assembly also includes a driven member or propeller hub 30 which carries on its exterior a plurality of circumferentially spaced, radially extending propeller blades 32 which may be of any desired configuration to provide the desired force to drive the boat 14.

The interior surface of hub 30 defines a plurality of circumferentially spaced axially extending full semi-circular grooves 34. It will be noted that the semi-circular grooves 34 are arranged to image the semi-circular grooves 26 in the driver member 22, thus forming a plurality of spaced radially disposed and axially aligned cylinders with each having its inner half formed by the driver member 22 and its outer half formed by the hub or driven member 30.

An elastomeric member 36 may be inserted into each or only selected one of the cylinders. Each member 36 is generally circular in cross-section in its smallest dimension and large enough so that it fits closely within the full diameter of the cylinder formed by the mating semi-circular grooves 26 and 34.

The elastomeric member 36 may be, for example, a rod having a diameter and length equal to the dimensions of the cylinder. Thus, with each cylinder filled with an elastomeric rod, torque is transmitted from the driver to the driven hub member across the full diameter of the entire length of all rods simultaneously. The compressibility of the material of the rod thus determines the degree of relative movement between the driver and the driven member available to compensate for shock. The total length of all the rods determines the total torque load available before shearing occurs. It will thus be noted that maximum shear load can be varied by filling less than the full length of each cylinder with elastomeric rod. For example, short rods having lengths less than the length of the cylinders can be used to lower maximum shear load capacity while maintaining full rotational arc shock resistance. Alternatively, elastomeric rods may be placed in less than all of the cylinders to accomplish similar results.

It will be noted that the closest adjacent portions of the driven hub 30 and the driver member 22 are disposed near the diameter of the elastomeric members 34 so that the maximum thickness is provided by the members 34 to resist shear or relative rotation between the driver member 22 and the hub 30. It will also be noted that each of the members 36 is independent and thus can be simply made from a rod of elastomeric material having a diameter essentially the same as the diameter of the cylinders. Thus, no special molds are required and the elastomeric members 34 can be manufactured easily and inexpensively and the replacement thereof can be easily obtained.

An unexpected discovery resulting from the structure of the invention is that the rate of compression of the elastomeric member 36 can be varied as desired to permit the compression load to rapidly increase with relative movement of the driver with respect to the driven member. This permits vastly increased shock absorbing characteristics while maintaining resistance over the full arc of relative movement and maximum shear resistance. To accomplish this effect, spherical bodies having a circular cross-section as their smallest dimension which is equal to the diameter of the cylinders are used as the elastomeric member 36. To acheive the greatest compression from minimum load to maximum load, round balls or spheres are used. It will be noted that when a ball which has a diameter equal to the diameter of the cylinder is used, only the edge of the ball is initially compressed. Thus, compression is permitted with relatively light loads. However, as the relative rotational arc of the driver to the driven member is increased, the portion of the ball which is subject to compression is increased because the portion of ball lying in the axial direction of the cylinder is increased. Thus resistance increases along a curve relative to the curved surface of the ball. The rate of movement versus resistance will be greatest when the elastomeric body is a round ball and will be the least when the elastomeric body is a continuous rod. Various rates between these two extremes can be achieved by using ellipsoid bodies of various lengths.

As when rods are used, maximum shear load can be varied as desired by using fewer spherical or ellipsoid bodies than necessary to fill the full length of all the cylinders. Furthermore, the rate of compression can be even more infinitely varied between the two extremes by using combinations of short sections of rods and spheres or ellipsoids.

A particularly unique advantage of using balls instead of rods is that the balls may rotate 360° in any plane. Thus, wear on the surface of the balls is greatly minimized when compared to wear on rods which is confined to 360° in only one plane.

While virtually any compressible material can be utilized to form the members 34, it is desired that the members be formed from a material such as neoprene and preferably from a neoprene having a hardness durometer of about 60–90. The preferred durometer is about 80. A hardness durometer of 80 provides excellent shearing strength while at the same time providing for deformation of the member to some extent to absorb shock loads should the propeller blades 32 strike an object in the water. It will also absorb shock loads imposed as a result of extremely high torque being applied through the shaft 16 to the propeller 10.

To utilize the coupling described herein, the driver member 22, when off the shaft 12, is provided with the elastomeric members 34 which are placed in the grooves 26. The hub 30 is then slipped thereover with the grooves 34 therein aligned to receive the members 36. Once the initial subassembly of the driver 22, elastomeric members 36 and hub 30 has taken place, the assembled propeller 10 is slipped over the shaft 12 with the splines 16 and 24 in mating relationship. The nut 20 is then screwed onto the thread 18 and provided with suitable locking pins or keys (not shown) to prevent inadvertent dislodgment of the propeller 10 from the shaft 12.

It can be seen then that when the engine or boat 14 is in operation, torque is transmitted through the shaft 12, the driver member 22, and elastomeric members 36 to the propeller 10. Should an object in the water be struck or excess torque imposed by the engine, the hub 30 and driver member 22 may move slightly relative to each other due to the resiliency of the members 36, but the operation of the propeller 10 will not be impaired until the force imposed is sufficiently great to shear all the elastomeric members 36 across their full diameters simultaneously.

It will be observed that the semi-circular grooves 26 in the driver member 22 and the semi-circular grooves 34 in the hub 30 are equal in number and spaced in parallel arrangement about the outer and inner surfaces of the driver and hub, respectively. Accordingly, the cylinders formed by the aligned grooves are disposed radially within the coupling with the geometric central axis of each cylinder lying on the circumference defined by the maximum diameter of the driver which, of course, is approximately equal to the minimum internal diameter of the hub 30. Accordingly, without the elastomeric members 36 in place, the driver 22 would rotate freely within the hub 30. However, with elastomeric members 36 positioned within each of the cylinders, torque is transmitted from the driver 22 to the hub 30 across the full diameter of each elastomeric member 36. Since the members 36 are individual bodies, they may each rotate within their individual cylinders. Thus, the expected life of each member 36 should be substantially lengthened since compression stresses are not always applied at the same points on the circumference of the member 36.

The size and number of cylinders to be formed will depend, of course, upon the torque to be transmitted and the physical characteristics of the elastomeric members 36. However, because each elastomeric member 36 can be removed and replaced individually, the maximum torque to be transmitted to the hub 30 can be adjusted as desired by removing some of the elastomeric members 36 entirely, reducing the length of some or all of the elastomeric members 36 and/or substituting elastomeric members with differing physical characteristics or shapes as described above.

It should be understood that while the invention has been described hereinabove in connection with its use as a coupling for joining a marine propeller to a shaft for driving the propeller, many other uses can be envisioned for the coupling. The coupling may, of course, be used for various other shaft couplings for various other purposes. For example, FIG. 3 illustrates in simplified form a coupling 100 which can be utilized to couple a first shaft 102 with a second shaft 104. As illustrated, shaft 104 has an enlarged portion 106 which is provided with a plurality of circumferentially spaced semi-circular grooves 108. The enlarged portion 106 is large enough to receive in telescoping relationship an enlargement 110 on shaft 102. The exterior of the enlargement 110 is also provided with a plurality of semi-circular recesses 112.

The recesses 108 and 112 are arranged as described above to form a plurality of cylinders which are sized to receive a plurality of elastomeric members 114. The elastomeric members 114 prevent relative rotation between the shaft 102 and 104 and thus transmit torque therethrough. Due to their elasticity, they also absorb shock transmitted by the shafts 102 or 104.

The coupling described hereinabove can be relatively easily and simply constructed, can be maintained easily and inexpensively, and will provide the desired torque transmission as well as shock absorption between the drive and driven members.

While the coupling hub assembly of the invention has been described in detail hereinabove with respect to certain preferred embodiments, it will be understood that various changes and modifications can be made thereto without departing from the spirit and scope of the invention as defined by the appended claims.

What is claimed:

1. A marine propeller and hub assembly comprising:
   (a) a driver member adapted to receive a propeller drive shaft in driving relationship having an exterior surface defining an axially elongated body of a first maximum diameter and a plurality of grooves semi-circular in cross-section aligned substantially parallel with each other and extending generally axially along the exterior surface of said driver member;
   (b) a marine propeller having a hub defining a centrally disposed aperture passing axially therethrough receiving said driver member therein, the internal surface of said aperture defining an elongated cavity circular in cross-section and having a minimum internal diameter not less than said first maximum diameter in any common cross-sectional plane, said aperture also having a plurality of grooves semi-circular in cross-section aligned sustantially parallel with each other and aligned with mating grooves in said driver member, each mating pair of grooves defining a generally axially extending cylinder which is substantially circular in cross-section, approximately one-half of which is defined by a groove in said driver member and approximately one-half of which is defined by an aligned groove in said hub; and
   (c) an elastomeric body having a circular cross-section in its smallest dimension which is substantially equal to the diameter of at least one of said cylinders confined within said at least one of said cylinders.

2. An assembly as defined in claim 1 wherein said elastomeric body is in the form of an elongated rod.

3. An assembly as defined in claim 1 wherein said elastomeric body is in the form of a sphere.

4. An assembly as defined in claim 1 wherein said elastomeric body is in the form of an ellipsoid.

5. An assembly as defined in claim 1 having a plurality of elastomeric bodies, each having a circular cross-section in its smallest dimension which is substantially equal to the diameter of the cylinder in which it is confined.

6. An assembly as defined in claim 1 wherein said elastomeric body has a hardness durometer of about 60 to 90.

7. An assembly as defined in claim 6 wherein said hardness durometer is about 80.

8. An assembly as defined in claim 1 wherein said elastomeric body is a neoprene.

9. A hub assembly comprising:
   (a) a driver member adapted to receive a drive shaft in driving relationship having an exterior surface defining an axially elongated body of a first maximum diameter and a plurality of grooves semi-circular in cross-section aligned substantially parallel with each other and extending generally axially along the exterior surface of said driver member;

(b) a driven member defining a centrally disposed aperture passing axially therethrough telescopically receiving said driver member therein, the internal surface of said aperture defining an elongated cavity circular in cross-section and having a minimum internal diameter not less than said first maximum diameter in any common cross-sectional plane, said aperture also having a plurality of grooves semi-circular in cross-section aligned sustantially parallel with each other and aligned with mating grooves in said driver member, each mating pair of grooves defining a generally axially extending cylinder which is substantially circular in cross-section, approximately one-half of which is defined by a groove in said driver member and approximately one-half of which is defined by an aligned groove in said driven member; and (c) an elastomeric body having a circular cross-section in its smallest dimension which is substantially equal to the diameter of at least one of said cylinders confined within said at least one of said cylinders.

* * * * *